US012606021B2

(12) United States Patent (10) Patent No.: US 12,606,021 B2
Braun et al. (45) Date of Patent: Apr. 21, 2026

(54) OPERATING UNIT FOR A STEERING WHEEL OF A MOTOR VEHICLE AND METHOD FOR DETERMINING A POSITION OF A SYMBOL DISPLAY

(71) Applicant: Bayerische Motoren Werke Aktiengesellschaft, Munich (DE)

(72) Inventors: Simon Braun, Laaber (DE); Christian Knoll, Munich (DE); Kenneth Weselake, Unterhaching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 251 days.

(21) Appl. No.: 18/499,310

(22) Filed: Nov. 1, 2023

(65) Prior Publication Data

US 2024/0182100 A1 Jun. 6, 2024

(30) Foreign Application Priority Data

Dec. 1, 2022 (DE) ...................... 10 2022 131 901.6

(51) Int. Cl.
*B60K 35/10* (2024.01)
*B60K 35/22* (2024.01)
(Continued)

(52) U.S. Cl.
CPC .............. *B60K 35/10* (2024.01); *B60K 35/22* (2024.01); *B60K 35/28* (2024.01); *B60K 35/60* (2024.01);
(Continued)

(58) Field of Classification Search
None
See application file for complete search history.

(56) References Cited

U.S. PATENT DOCUMENTS 9,367,203 B1 * 6/2016 Costello .............. G06F 3/04815
9,940,518 B1 * 4/2018 Klingström .......... G06V 40/193
(Continued)

FOREIGN PATENT DOCUMENTS

DE 10 2017 200 949 A1 7/2018
DE 10 2017 201 036 A1 7/2018
(Continued)

OTHER PUBLICATIONS

German Search Report issued in German Application No. 10 2022 131 901.6 dated Aug. 2, 2023 with partial English translation (12 pages).

*Primary Examiner* — Jason A Pringle-Parker
(74) *Attorney, Agent, or Firm* — Crowell & Moring LLP

(57) ABSTRACT

Methods, systems, and apparatuses are provided for determining a position of a symbol display in an at least partially transparent operating unit for a steering wheel of a motor vehicle. A position of a symbol display unit is determined. A target position is determined for a visualization of a symbol using the symbol display relative to the symbol display unit. An average eye point when using the steering wheel relative to the symbol display unit is determined. A distance and a viewing angle of the average eye point relative to the symbol display unit is determined. A position of the symbol display in the symbol display unit is determined such that the visualization of the symbol by means of the symbol display, when viewed from the determined distance and the determined viewing angle from the average eye point, takes place at the target position for the visualization of the symbol.

8 Claims, 7 Drawing Sheets

(51) Int. Cl.
*B60K 35/28*          (2024.01)
*B60K 35/60*          (2024.01)
*B60K 35/65*          (2024.01)
*B62D 1/04*           (2006.01)

(52) U.S. Cl.
CPC ............ *B62D 1/046* (2013.01); *B60K 35/654* (2024.01); *B60K 2360/143* (2024.01); *B60K 2360/782* (2024.01)

(56)                     References Cited

U.S. PATENT DOCUMENTS

| | | | |
|---|---|---|---|
| 2005/0024342 A1* | 2/2005 | Young ................... | B60K 35/28 |
| | | | 345/173 |
| 2011/0030502 A1* | 2/2011 | Lathrop ................ | B60K 35/10 |
| | | | 74/552 |
| 2015/0084764 A1* | 3/2015 | Wunsche ............ | B60K 35/652 |
| | | | 340/462 |
| 2015/0286385 A1* | 10/2015 | Kim ....................... | B60K 35/22 |
| | | | 340/461 |
| 2019/0152319 A1* | 5/2019 | Wan ....................... | B62D 1/046 |
| 2019/0243527 A1* | 8/2019 | Kuribayashi ....... | G06F 3/04817 |
| 2019/0385574 A1 | 12/2019 | Helot et al. | |
| 2020/0348751 A1* | 11/2020 | Beineke ............... | G06F 3/1423 |

FOREIGN PATENT DOCUMENTS

| | | |
|---|---|---|
| DE | 10 2021 112 501 A1 | 11/2022 |
| WO | WO 2022/243013 A1 | 11/2022 |

* cited by examiner

OPERATING UNIT FOR A STEERING WHEEL OF A MOTOR VEHICLE AND METHOD FOR DETERMINING A POSITION OF A SYMBOL DISPLAY

CROSS REFERENCE TO RELATED APPLICATION

This application claims priority under 35 U.S.C. § 119 from German Patent Application No. 10 2022 131 901.6, filed Dec. 1, 2022, the entire disclosure of which is herein expressly incorporated by reference.

BACKGROUND AND SUMMARY

The present subject matter relates to a method for determining a position of a symbol display in an at least partially transparent operating unit for a steering wheel of a motor vehicle, to an operating unit for a steering wheel of a motor vehicle, to a steering wheel for a motor vehicle, and to a motor vehicle. The present subject matter is therefore in the field of steering wheels for motor vehicles.

Operating units may be arranged on the steering wheel of a motor vehicle. This makes it possible to operate and use various functions of the motor vehicle without having to remove one's hands from the steering wheel. In particular, a vehicle may have an operating unit (e.g. a button) that can be used to control different functions. The function that can be triggered by actuating the operating element may depend on the respective context of the actuation. The function that can be triggered in a specific context by actuating the operating element can be indicated by an illuminated symbol on the user interface of the operating element.

The operating unit may have, below a transparent user interface, a symbol display unit which is designed to selectively display a plurality of different symbols for the corresponding plurality of different functions of the operating element. The different symbols can each be arranged as a microstructure in different layers of the display unit. The different layers can be illuminated selectively from the side edge of the respective layer in order to make the symbol of the respective layer visible on the user interface of the operating element. Such a symbol display unit is described, for example, in the published patent application DE 10 2021 112 501 A1.

The use of different layers means that the different symbols may appear to be at different depths for a viewer. In addition, the light intensity with which the different symbols in the different layers on the user interface are perceived may vary. This can adversely affect the visibility of the different symbols and can be perceived by a viewer as being of little value. In addition, such an arrangement can lead to the fact that, depending on the distance and angle of view at which the viewer looks at the symbol display unit, the visualization of the symbols is perceived at different positions and accordingly a shift of the visualization relative to a target position can occur. This can result in the visualization of the symbols being out of place for the viewer and/or the visualizations even being obscured and/or cut off so that they can no longer be seen completely or at all by the viewer.

The object of the present subject matter is to specify an improved operating unit for a steering wheel and a method for determining a position of a symbol display that are suitable for enriching the prior art. A specific configuration of the present subject matter can achieve the object of enabling correct positioning of a symbol display in an at least partially transparent operating unit.

Accordingly, the object is achieved by a method for determining a position of a symbol display in an at least partially transparent operating unit for a steering wheel of a motor vehicle. The method comprises determining a position of a symbol display unit comprising the symbol display in the motor vehicle and determining a target position for a visualization of a symbol by means of the symbol display relative to the symbol display unit. The method is distinguished by the fact that the method further comprises determining an average eye point when using the steering wheel relative to the symbol display unit, and determining a distance and a viewing angle of the average eye point relative to the symbol display unit. In addition, the method comprises determining a position of the symbol display in the symbol display unit such that the visualization of the symbol by means of the symbol display, when viewed from the determined distance and the determined viewing angle from the average eye point, takes place at the target position for the visualization of the symbol.

The fact that the operating unit is at least partially transparent means that the operating unit can be at least partially translucent. In particular, the operating unit may be at least partially formed from glass and/or a transparent plastic. The operating unit may be transparent in particular in those areas which can be seen by the user when using the steering wheel. As a result of the fact that the operating unit is at least partially transparent, the symbol display unit can be integrated into the operating unit in such a way that it extends over a spatial depth area into the interior of the operating unit.

The symbol display unit may be a part of the operating element in which one or more symbol displays are formed, by means of which one or more symbols can be visualized in each case. Optionally, the symbol display unit may be formed as part of a light guide, into which light can be input. The symbol display may optionally be formed as a microstructure in the light guide, at which the light in the section is reflected and/or scattered in such a way that a visualization of the symbol on the operating unit, in particular on a user interface of the operating unit, becomes visible.

Determining the position of the symbol display unit in the motor vehicle may mean that the arrangement of the symbol display unit at a determined position in the motor vehicle, in particular on the steering wheel, is predefined. Determining the position of the symbol display in the symbol display unit and in the operating element may mean that the position of the symbol display within the symbol display unit and thus within or on the operating element is determined.

The visualization of the symbol is the visual appearance of the symbol which is caused by the symbol display and is perceived by the user of the steering wheel. The position of the visualization depends significantly on the position of the symbol display in the symbol display unit, but is significantly influenced by the distance of the user's eye and the viewing angle relative to the symbol display. In addition, any displacement of the position of the visualization relative to the position of the symbol display can be caused by refractive effects within the symbol display unit or within the operating element.

The target position for the visualization of the symbol can be that position at which a user is intended to perceive the visualization of the symbol according to predetermined specifications. In other words, the target position for the visualization of the symbol can be that position at which the symbol is displayed on the operating element or on the surface of the operating element.

The disclosure offers the advantage that it is possible to position a symbol display in an at least partially transparent operating unit such that the visualization takes place, for a multiplicity of users with different body dimensions and for a multiplicity of different vehicle types and vehicle classes, at the desired target position. In other words, the present subject matter offers the possibility of reducing the probability of a symbol visualized in an at least partially transparent operating unit being perceived as misplaced by the user of the steering wheel. Consequently, the present subject matter offers the advantage that the readability of an at least partially transparent operating unit can be improved and, accordingly, more reliable operation can be made possible. As a result, the present subject matter offers the possibility of increasing safety in road traffic, since unwanted incorrect operation of functions of the at least partially transparent operating unit can be reduced or even completely avoided.

Optionally, the determination of the average eye point relative to the symbol display unit is carried out in such a way that the average eye point is based on a geometric mean and/or an arithmetic mean of a plurality of predetermined eye points. This provides the possibility of minimizing on average a deviation of the actual eye points of any user from the average eye point used to determine the positioning of the symbol display and thus to achieve an appropriate position of the symbol display for many different actual eye points or users.

The plurality of predetermined eye points may comprise determined eye points relative to the symbol display unit for motor vehicles from different vehicle classes. Alternatively or additionally, the plurality of predetermined eye points may comprise eye points relative to the symbol display unit for a plurality of different body dimensions according to a statistical distribution of expected users of the steering wheel.

With the average eye point, it is thus possible to provide a reference point which allows optimization of the position of the symbol display that constitutes a suitable compromise for a large number of users with different body dimensions. The determined eye points relative to the symbol display unit for a plurality of different body dimensions according to a statistical distribution of expected users of the steering wheel may be based on commercially available statistical information about body dimensions of different populations and/or different parts of the population. Optionally, one or more different sitting positions, steering wheel settings and/ or seat indentation depths can be taken into account when determining the respective eye points.

The determined eye points relative to the symbol display unit for motor vehicles from different vehicle classes can vary from each other in that, in different vehicle classes, optionally different sitting positions of the user can be expected and/or a different relative arrangement of the steering wheel and thus of the operating unit relative to the user can be provided. Thus, different body dimensions of different users and/or different conditions in different vehicle classes can be taken into account when determining the position of the symbol display in the symbol display unit and in the operating unit and in this way it is possible to strive for positioning which is as universally suitable as possible for a large number of possible users and/or a large number of different vehicle classes.

The distance and the viewing angle of the average eye point relative to the symbol display unit can optionally be determined on the basis of a predetermined mean value for setting the steering wheel position. Based on this, a mean value for the distance and the viewing angle can optionally be determined and can then be used to determine the position of the symbol display. This offers the advantage that possible deviations of the actual distance and viewing angle of a user from the assumptions made when determining the position can be reduced or minimized.

Optionally, the method may further comprise determining a tolerance range for the distance and/or the viewing angle of the average eye point relative to the symbol display unit. This can offer the advantage that optionally a size of an area arranged around the symbol display can be determined, which area has to be free of structures in and/or on the operating unit in order to avoid or reduce unwanted covering of the visualization. The position of the symbol display in the symbol display unit can be determined in such a way that the visualization of the symbol by means of the symbol display, when viewed within the tolerance range, does not exceed a predetermined deviation from the target position for the visualization of the symbol. In other words, the tolerance range can optionally be used to indicate a maximum deviation of the actual distance and/or the actual viewing angle from the distance and/or viewing angle of the average eye point used for the positioning, in which a visualization of the symbol can be perceived by the user without any impairments.

Optionally, the position of the symbol display in the symbol display unit can be determined taking into account a refractive effect of the at least partially transparent operating unit on the visualization of the symbol. This allows any influences of the beam path of the light which is deflected by the symbol display and generates the visualization of the symbol to also be considered and to be incorporated into the positioning of the symbol display. A refractive effect of the at least partially transparent operating unit can optionally be caused by the shape of the operating unit, the material thickness of the operating unit between the symbol display and the eye point, as well as by local variations of the material of the operating unit. These can be predetermined, for example, and then taken into account when determining the position of the symbol display.

A further aspect provides a method for producing a steering wheel with an at least partially transparent operating unit having a symbol display for a motor vehicle. The method is distinguished by the fact that it comprises a method according to the present subject matter for determining a position of the symbol display in the at least partially transparent operating unit. The information disclosed for the method for determining a position of the symbol display in the at least partially transparent operating unit should also be regarded as disclosed for the method for producing a steering wheel.

A further aspect provides an operating unit for a steering wheel of a motor vehicle, wherein the operating unit is at least partially optically transparent. The operating unit has an optically transparent housing which can be arranged on the steering wheel. In addition, the operating unit has a light guide with at least one light input element and a symbol display unit, wherein the symbol display unit extends at least partially within the optically transparent housing and has at least one optical symbol display. In addition, the operating unit has a light source which is designed to input light into the symbol display unit via the light input element such that at least some of the input light is deflected by the at least one symbol display of the symbol display unit and is output from the operating unit for the visualization of a symbol to a user of the steering wheel. The operating unit is distinguished by the fact that a position of the symbol display in the symbol display unit is determined on the basis of a determined average eye point in such a way that the visualization of the symbol by means of the symbol display, when viewing the symbol display from a determined distance and a determined viewing angle from the average eye point, takes place at a predetermined target position for the visualization of the symbol. The information disclosed for the method for determining a position of the symbol display in the at least partially transparent operating unit should also be regarded as disclosed for the operating unit.

A further aspect provides a steering wheel for a motor vehicle, which comprises an operating unit according to the present subject matter. The information disclosed for the method for determining a position of the symbol display in the at least partially transparent operating unit and for the operating unit should also be regarded as disclosed for the steering wheel.

A further aspect provides a motor vehicle comprising a steering wheel according to the present subject matter. The information disclosed for the method for determining a position of the symbol display in the at least partially transparent operating unit, for the operating unit and for the steering wheel should also be regarded as disclosed for the motor vehicle.

The motor vehicle may be a passenger vehicle, in particular an automobile, or a commercial vehicle, such as a truck. The motor vehicle may be designed to undertake longitudinal guidance and/or lateral guidance, at least partially and/or at least temporarily, during automated driving of the motor vehicle. Automated driving can be carried out in such a way that the motor vehicle's movement is (largely) autonomous. Automated driving can be controlled at least partially and/or temporarily by the data processing apparatus.

It is understood that the features and examples mentioned above and explained below should not only be considered disclosed in the combinations explicitly mentioned in each case, but that other technically meaningful combinations and examples are also included in the present subject matter content.

An example is described below with reference to the figures.

Other objects, advantages and novel features of the present subject matter will become apparent from the following detailed description of one or more preferred examples when considered in conjunction with the accompanying drawings.

DETAILED DESCRIPTION OF THE DRAWINGS

In the figures, identical and or similar elements are provided with the same reference signs.

Figure 1:
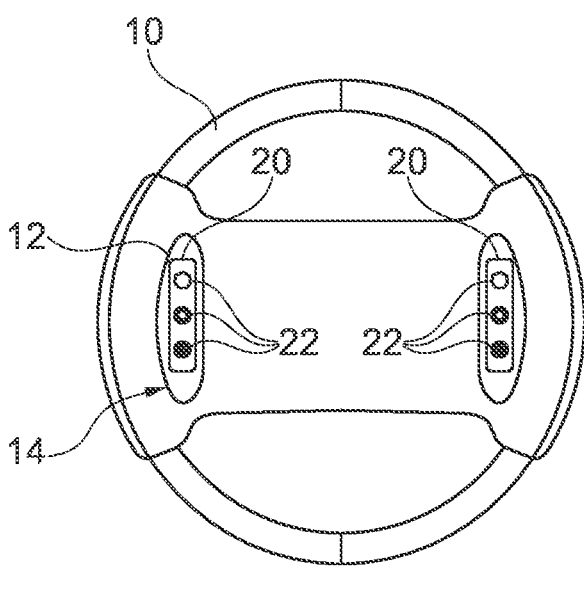
FIG. 1 shows a schematic illustration of a steering wheel of a motor vehicle according to an optional example.

FIG. 1 shows a schematic illustration of a steering wheel 10 of a motor vehicle 100 according to an optional example. The steering wheel 10 has two operating units 12 which are at least partially optically transparent. Each of the operating units 12 in turn has an optically transparent housing 14 which is arranged on the steering wheel 10 and can be operated while the hands are on the steering wheel 10.

In addition, each of the operating units 12 has a light guide 16 (concealed, see FIG. 2) with at least one light input element 18 and a symbol display unit 20, wherein the symbol display unit 20 extends at least partially within the optically transparent housing 14 and has at least one optical symbol display 22.

In addition, each of the operating units 12 has a light source 19 (concealed, see FIG. 5C) which is designed to input light into the symbol display unit 20 via the light input element 18 such that at least some of the input light is deflected by the at least one symbol display 22 of the symbol display unit 20 and is output from the operating unit 12 for the visualization 32 of a symbol to a user of the steering wheel 10.

A position of the symbol display 22 in the symbol display unit 20 is determined on the basis of a determined average eye point 24 in such a way that the visualization 32 of the symbol by means of the symbol display 22, when viewing the symbol display 22 from a determined distance and a determined viewing angle from the average eye point 24, takes place at a predetermined target position for the visualization 32 of the symbol.

Figure 2:
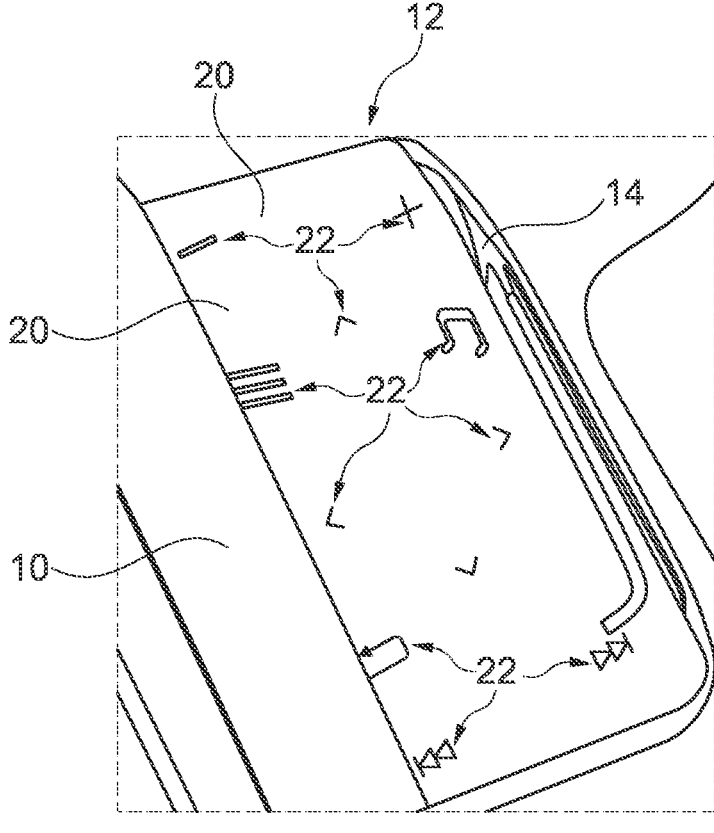
FIG. 2 shows an illustration of an operating unit according to an optional example.

FIG. 2 shows an illustration of an operating unit 12 according to an optional example, which is fastened to a steering wheel 10. A light guide 16 with at least one light input element 18 (concealed by the steering wheel) and a symbol display unit 20 extends within a transparent housing 14, wherein the symbol display unit 20 extends at least partially within the optically transparent housing 14 and has a plurality of optical symbol displays 22. The operating unit 12 may be designed for the user to be able to actuate one of these assigned functions of the operating unit 12 by a finger press on the corresponding symbol display 22. In the illustrated optional example, the operating unit 12 is configured to control a selection and playback of multimedia contents. A plurality of symbol displays 22 are formed for this purpose and allow the user to increase or reduce the volume, to select a source for multimedia contents, to display contents in a list view and to select elements from the list and to initiate playback of the next or previous multimedia contents by means of a corresponding actuation.

As a result of the fact that the symbol displays 22 are not directly arranged on the surface of the operating unit 12, but can be formed deeper inside the operating unit 12 or in the light guide 16, a position of the visualization 32 of the associated symbol generated by illuminating the symbol display 22 can depend on the distance at which and the angle at which the eye point of the viewer or user is arranged relative to the symbol display unit 20. Furthermore, refractive effects of the light guide 16 and the transparent housing 14 may influence the position of the visualization 32 of the symbol relative to the position of the symbol display 22 in the symbol display unit 20. Without suitably determining the symbol display 22 and/or when viewing the symbol display unit 20 from an eye point outside a predetermined tolerance range 28, undesirable optical effects may occur, as a result of which the visualization 32 of the symbols is partially or completely concealed and/or overlaps other elements and/or contours of the symbol display unit 20 or the housing 14. This is indicated, for example, in the visualization 32 of the symbol for selecting the previous playback title in the lower left-hand corner of the symbol display unit 20 (double arrow pointing to the left), in which a disruption of the visualization 32 of the symbol can be perceived at the upper edge of the symbol as a result of an overlay with a contour of the symbol display unit 20, and the visualization accordingly deviates from the visualization intended by means of the symbol display 22. This can be avoided by means of a suitable method for determining the position of the symbol display 22, as described below.

Figure 3:
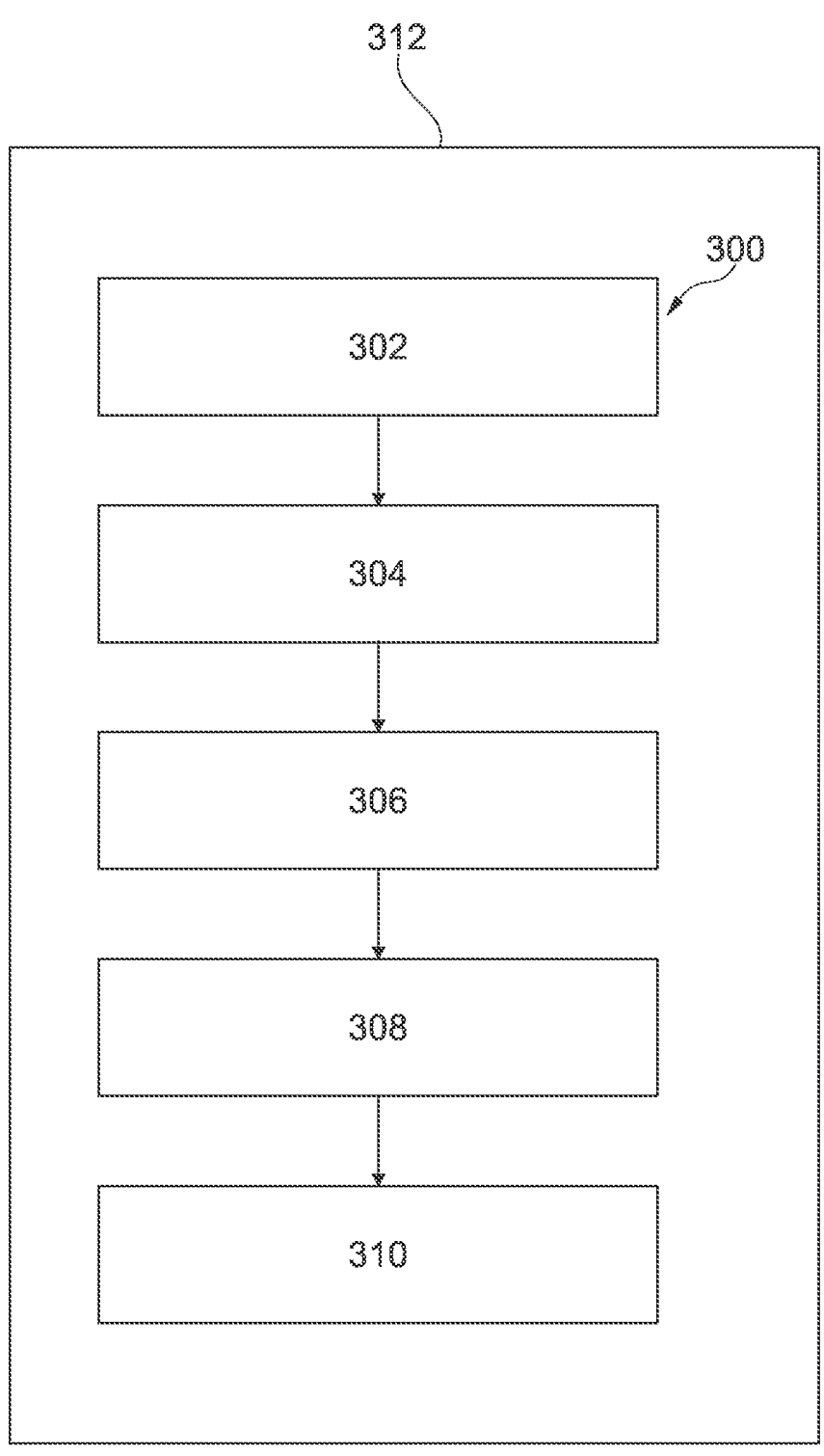
FIG. 3 shows an optional example of a method for determining a position of a symbol display in an at least partially transparent operating unit for a steering wheel of a motor vehicle.

An optional example of a method 300 for determining a position of a symbol display 22 in an at least partially transparent operating unit 12 for a steering wheel 10 of a motor vehicle 100 is described with reference to FIG. 3.

In a step 302, the method 300 comprises determining a position of a symbol display unit 20 comprising the symbol display 22 in the motor vehicle 100 or on the steering wheel 10 and determining a target position for a visualization 32 of a symbol by means of the symbol display 22 relative to the symbol display unit 20.

In a step 304, the method 300 further comprises determining an average eye point 24 during use of the steering wheel 10 relative to the symbol display unit 20. The distance and the viewing angle of the average eye point 24 relative to the symbol display unit 20 can optionally be determined on the basis of a predetermined mean value for setting the steering wheel position.

In a step 306, the method 300 comprises determining a distance and a viewing angle of the average eye point 24 relative to the symbol display unit 20.

Optionally, in a step 308, the method 300 may comprise determining a tolerance range 28 for the distance and/or the viewing angle of the average eye point 24 relative to the symbol display unit 20.

In a step 310, according to the method 300, a position of the symbol display 22 in the symbol display unit 20 is determined such that the visualization 32 of the symbol by means of the symbol display 22, when viewed from the determined distance and the determined viewing angle from the average eye point, takes place at the target position for the visualization 32 of the symbol. The position of the symbol display 22 in the symbol display unit 20 can also be determined 310 in such a way that the visualization 32 of the symbol by means of the symbol display 22, when viewed within the tolerance range 28, does not exceed a predetermined deviation from the target position for the visualization 32 of the symbol. The position of the symbol display 22 in the symbol display unit 20 can also be determined taking into account a refractive effect of the at least partially transparent operating unit 12 on the visualization 32 of the symbol.

The method 300 for determining a position of the symbol display 22 in the at least partially transparent operating unit 12 may form part of a method 312 for producing a steering wheel 10 and may be carried out accordingly during the method 312 for producing the steering wheel 10.

Figure 4:
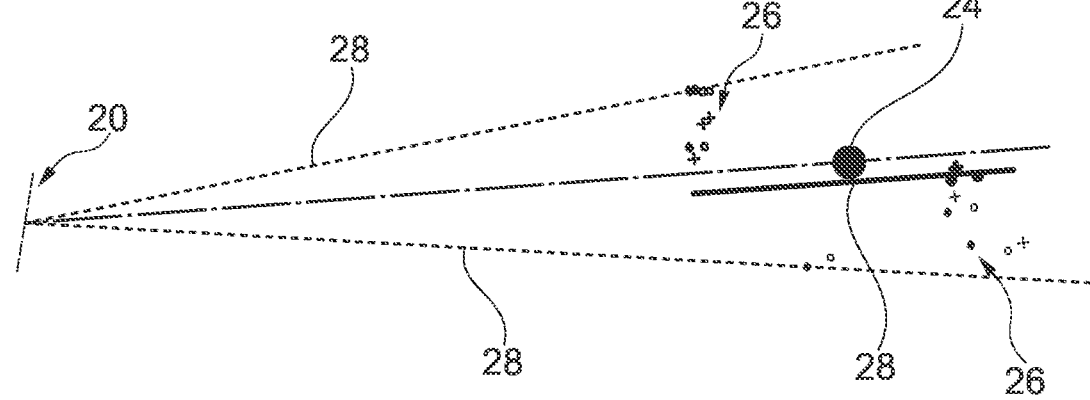
FIG. 4 illustrates the determination of the average eye point relative to the symbol display unit.

As illustrated in FIG. 4, the method step 304 of determining the average eye point 24 relative to the symbol display unit 20, as described with reference to FIG. 3, can be carried out in such a way that the average eye point 24 is based on a geometric mean or an arithmetic mean of a plurality of predetermined eye points 26. The plurality of predetermined determined eye points 26 may comprise the expected eye points 26 in motor vehicles from different vehicle classes and/or eye points relative to the symbol display unit 20 for a plurality of different body dimensions according to a statistical distribution of expected users of the steering wheel. The predetermined eye points 26 can be translated and rotated in such a way that the eyes are directed at the same steering wheel 10. Likewise, an adjustment of the steering wheel position to the conditions typical of the vehicle class can be incorporated into the determination of the average eye point 24. The geometric center of the symbol display unit 20 can serve as a reference point of the symbol display unit 20. The geometric eye point can then also be used to determine an associated distance and an angle of view relative to the symbol display unit 20. Optionally, the tolerance range 28 for the distance and/or the viewing angle of the average eye point relative to the symbol display unit 20 can also be determined on the basis of the predetermined eye points 26 and their spatial distribution (step 308) such that a desired subset of the predetermined eye points 26 is within the tolerance range 28. The tolerance range 28 relating to the viewing angle is indicated by dashed lines, while the tolerance range 28 relating to the distance is indicated by a solid line below the average eye point 24.

Figure 5A:
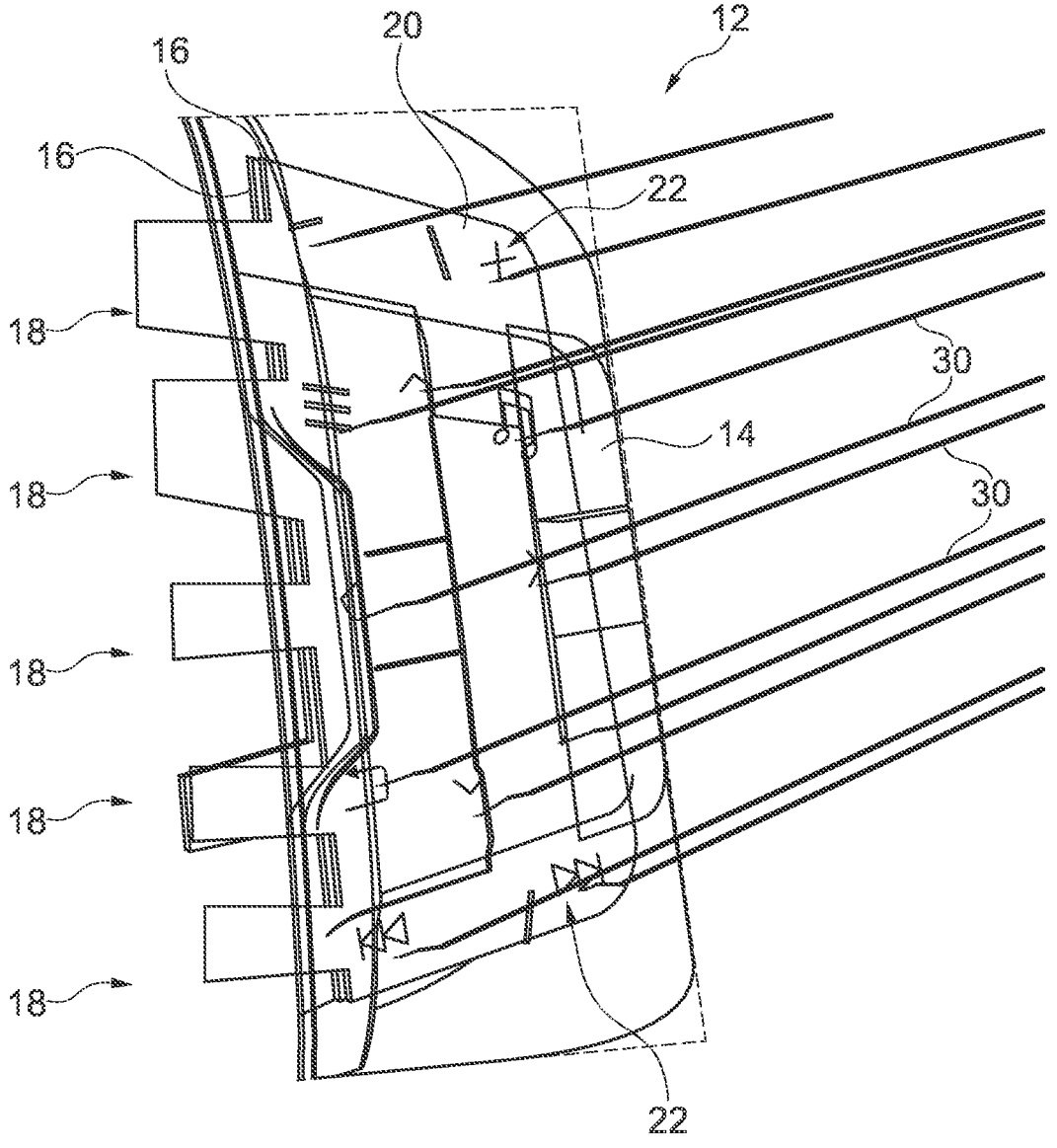
FIG. 5A shows, by way of example, a detailed view of the operating unit from FIG. 2.

FIG. 5A shows, by way of example, a detailed view of the operating unit 12 from FIG. 2 in a partially transparent illustration. It can be seen that the operating unit 12 can have a plurality of light guides 16 above one another. This can be used to arrange different symbol displays in different planes and/or to visualize them in different colors by inputting light of different colors into the different light guides 16. In addition, the light input elements 18 can be seen in FIG. 5A. Between these and/or at their end, light sources 19 (see FIG. 5C), such as light-emitting diodes, can be arranged in order to input light into the individual light guides 16. Further details are described in document DE 10 2021 112 501 A1.

In addition, the optical paths 30 of the light that is deflected by the respective symbol displays 22 out of the light guide 16 to the eye point are visualized with the lines 30 in FIG. 5A. It can be seen that these optical paths run in a straight line outside the operating unit 12 and may be refracted one or more times within the operating unit 12, that is to say between the symbol display 20 in the light guide 16 and the surface of the operating unit 12, which can be caused by changes in the refractive index in different layers of the operating unit 12. These light refractions can contribute to the fact that the visualizations 32 of the symbols perceived by the user at the eye point can deviate from the actual position of the respective symbol display 22. These effects can be accordingly considered in the method 300 for determining a position of a symbol display 22.

Figure 5B:
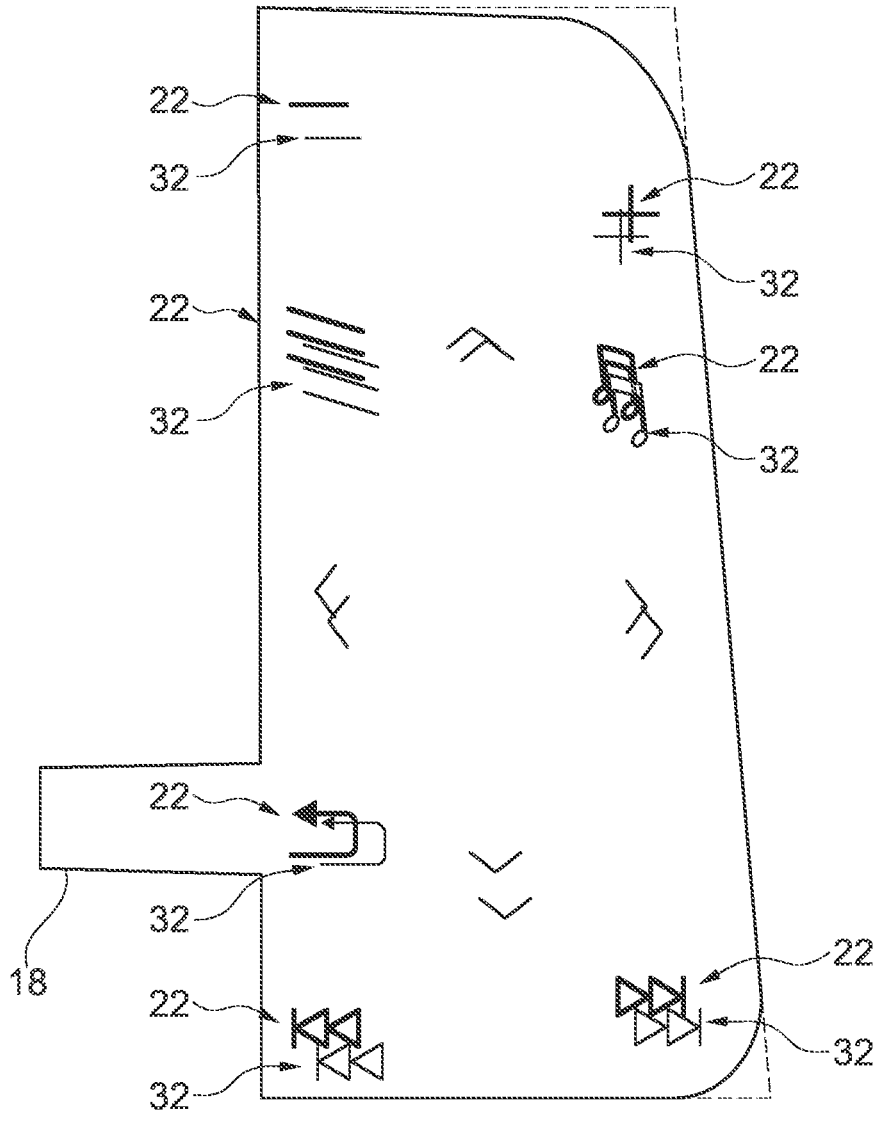
FIG. 5B shows a corresponding comparison of the position of the symbol displays in the light guide and the positions of the visualizations of the symbols perceived at the average eye point.

FIG. 5B shows a corresponding comparison of the position of the symbol displays 22 in the light guide 16 and the positions of the visualizations 32 of the symbols perceived at the average eye point 24. This illustrates that, without proper consideration of various optical effects and the parallax, a considerable shift between the target position and the actual position of the visualization 32 of the symbols can occur. By means of a method according to the present subject matter, however, the positions of the symbol displays 22 can be determined such that the visualizations 32 of the symbols are carried out at the respective target positions.

Figure 5C:
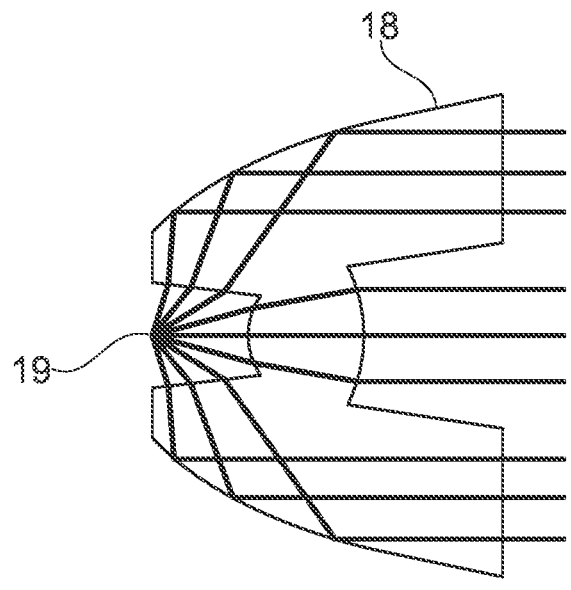
FIG. 5C shows, by way of example, a further optional configuration of a light input element.

FIG. 5C shows, by way of example, a further optional configuration of a light input element 18 and a relative arrangement with respect to a light source 19 which can optionally be in the form of a light-emitting diode. The light input element 18 is designed in such a way that a minimum light loss occurs during input of the light. For this purpose, the surfaces of the light input element 18 can be selected such that the incidence angle of the light to be input is as close as possible to the surface normal of the respective surfaces. In addition, the light input element 18 shown can optionally be configured such that it collimates the input light at least partially.

Figure 5D:
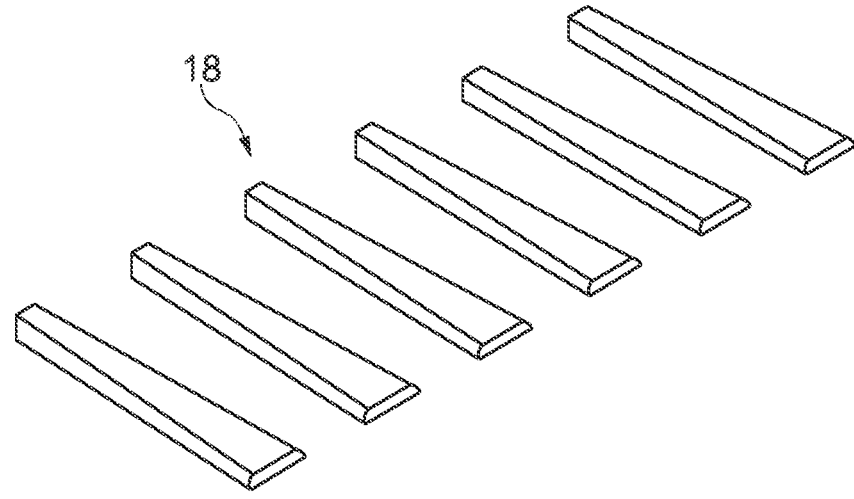
FIG. 5D shows further optional examples of light input elements.

FIG. 5D shows further optional examples of light input elements 18. These are distinguished by the fact that they have a varying thickness profile and are angled on some surfaces and/or edges. This allows optimized light input and distribution and optionally allows total internal reflection of the input light in the light guide 16 to be ensured. The light input elements 18 according to the example shown are thin at one end thin in the form of fingers with an almost square cross section and change their cross-sectional shape to the other end to a strongly flattened and widened shape with an angled end surface.

The housing 14 and/or the light guide 16 and/or the symbol display unit 20 can be at least partially optically sealed at their outer edges, for example provided with an absorbent element, in order to prevent an undesirable escape of light and/or to avoid unwanted reflections within the light guide 16.

Figure 6:
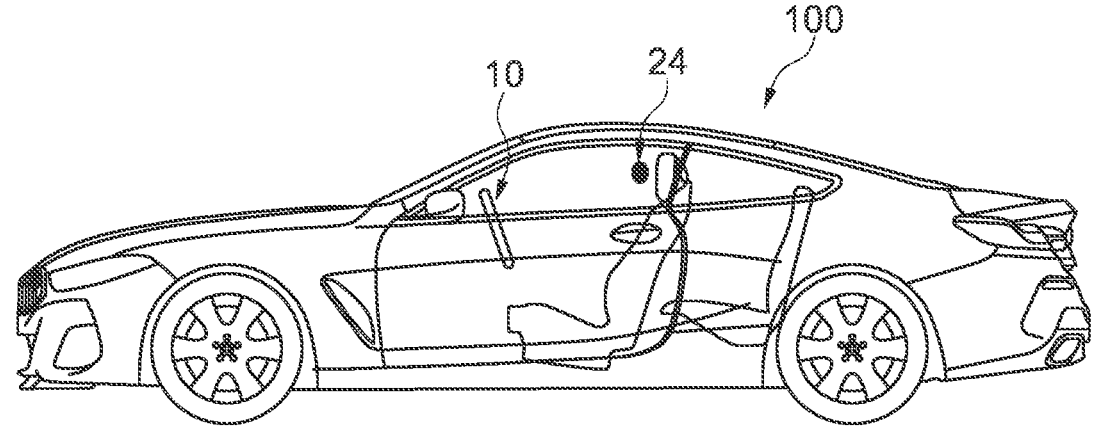
FIG. 6 shows a schematic illustration of a motor vehicle according to an optional example.

FIG. 6 shows a schematic illustration of a motor vehicle 100 according to an optional example with a steering wheel 10 according to the present subject matter. In addition, the average eye point 24 is indicated by way of example.

The term module (and other similar terms such as unit, subunit, submodule, etc.) in the present subject matter may refer to a software module, a hardware module, or a combination thereof. Modules implemented by software are stored in memory or non-transitory computer-readable medium. The software modules, which include computer instructions or computer code, stored in the memory or medium can run on a processor or circuitry (e.g., ASIC, PLA, DSP, FPGA, or other integrated circuit) capable of executing computer instructions or computer code. A hardware module may be implemented using one or more processors or circuitry. A processor or circuitry can be used to implement one or more hardware modules. Each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices and stored in memory or non-transitory computer readable medium.

The foregoing disclosure has been set forth merely to illustrate the present subject matter and is not intended to be limiting. Since modifications of the disclosed examples incorporating the spirit and substance of the present subject matter may occur to persons skilled in the art, the present subject matter should be construed to include everything within the scope of the appended claims and equivalents thereof.

LIST OF REFERENCE SIGNS

10 Steering wheel
12 Operating unit
14 Housing
16 Light guide
18 Light input element
19 Light source
20 Symbol display unit
22 Symbol display
24 Average eye point
26 Predetermined eye points
28 Tolerance range
30 Optical path
32 Visualization of a symbol
100 Motor vehicle
300 Method for determining a position of the symbol display 22
302-310 Method steps
312 Method for producing a steering wheel

What is claimed is:

1. A method for determining a position of a symbol display in an at least partially transparent operating unit for a steering wheel of a motor vehicle, the method comprising:

determining a position of a symbol display unit comprising the symbol display in the motor vehicle;

determining a target position for a visualization of a symbol using the symbol display relative to the symbol display unit;

determining an average eye point when using the steering wheel relative to the symbol display unit;

determining a distance and a viewing angle of the average eye point relative to the symbol display unit; and determining a position of the symbol display in the symbol display unit such that the visualization of the symbol using the symbol display, when viewed from the determined distance and the determined viewing angle from the average eye point, takes place at the target position for the visualization of the symbol, wherein the determination of the average eye point relative to the symbol display unit is carried out such that the average eye point is based on a geometric mean and/or an arithmetic mean of a plurality of predetermined eye points.

2. The method according to claim 1, wherein the plurality of predetermined eye points relative to the symbol display unit comprise eye points for motor vehicles from different vehicle classes and/or eye points for a plurality of different body dimensions according to a statistical distribution of expected users of the steering wheel.

3. The method according to claim 1, wherein the distance and the viewing angle of the average eye point relative to the symbol display unit is determined based on a predetermined mean value for setting the steering wheel position.

4. The method according to claim 1, further comprising: determining a tolerance range for the distance and/or the viewing angle of the average eye point relative to the symbol display unit, wherein the position of the symbol display in the symbol display unit is further determined in such a way that the visualization of the symbol using the symbol display, when viewed within the tolerance range, does not exceed a predetermined deviation from the target position for the visualization of the symbol.

5. The method according to claim 1, wherein the position of the symbol display in the symbol display unit is determined considering a refractive effect of the at least partially transparent operating unit on the visualization of the symbol.

6. A method for producing a steering wheel with an at least partially transparent operating unit having a symbol display for a motor vehicle, comprising:

determining a position of the symbol display in the at least partially transparent operating unit according to claim 1.

7. A method for determining a position of a symbol display in an at least partially transparent operating unit for a steering wheel of a motor vehicle, the method comprising:

determining a position of a symbol display unit comprising the symbol display in the motor vehicle;

determining a target position for a visualization of a symbol using the symbol display relative to the symbol display unit;

determining an average eye point when using the steering wheel relative to the symbol display unit;

determining a distance and a viewing angle of the average eye point relative to the symbol display unit; and determining a position of the symbol display in the symbol display unit such that the visualization of the symbol using the symbol display, when viewed from the determined distance and the determined viewing angle from the average eye point, takes place at the target position for the visualization of the symbol, wherein the distance and the viewing angle of the average eye point relative to the symbol display unit is determined based on a predetermined mean value for setting the steering wheel position.

8. A method for determining a position of a symbol display in an at least partially transparent operating unit for a steering wheel of a motor vehicle, the method comprising:

determining a position of a symbol display unit comprising the symbol display in the motor vehicle;

determining a target position for a visualization of a symbol using the symbol display relative to the symbol display unit;

determining an average eye point when using the steering wheel relative to the symbol display unit;

determining a distance and a viewing angle of the average eye point relative to the symbol display unit; and determining a position of the symbol display in the symbol display unit such that the visualization of the symbol using the symbol display, when viewed from the determined distance and the determined viewing angle from the average eye point, takes place at the target position for the visualization of the symbol, wherein the position of the symbol display in the symbol display unit is determined considering a refractive effect of the at least partially transparent operating unit on the visualization of the symbol.

\* \* \* \* \*